United States Patent [19]

Snider

[11] 3,794,784

[45] Feb. 26, 1974

[54] ROTARY WAFER SWITCH HAVING ROTOR MOUNTED, SPIRAL ARRANGED AXIAL BRIDGING CONTACTS

[75] Inventor: Richard J. Snider, Dallas, Tex.

[73] Assignee: Atlantic Richfield Company, Los Angeles, Calif.

[22] Filed: May 7, 1973

[21] Appl. No.: 357,831

[52] U.S. Cl. .......................... 200/11 A, 200/11 DA

[51] Int. Cl. .......................................... H01h 19/58

[58] Field of Search 200/11 A, 11 D, 11 DA, 11 G, 200/166 BE, 166 BF, 24

[56] References Cited

UNITED STATES PATENTS

| | | | |
|---|---|---|---|
| 1,832,869 | 11/1931 | Macy | 200/11 A X |
| 1,934,368 | 11/1933 | Macy | 200/11 A |
| 2,709,734 | 5/1955 | Coliz | 200/11 A |
| 3,284,584 | 11/1966 | Didyk | 200/11 A |
| 3,694,589 | 9/1972 | Toutain | 200/11 A |
| 3,586,797 | 6/1971 | Gerhardt et al. | 200/11 DA X |
| 2,967,216 | 1/1961 | Zablocki et al. | 200/11 A X |

*Primary Examiner*—J. R. Scott

*Attorney, Agent, or Firm*—M. David Folzenlogen

[57] ABSTRACT

A switch for stepping in rotation a plurality of inputs to a corresponding plurality of outputs includes first, second, and third wafers of electrical insulating material. The first wafer presents a number of coaxial rings of an electrically conducting material printed onto the first wafer. The third wafer presents a plurality of electrical conductors radially extending from a central axis point. Intermediate the first and third wafers is a second wafer which carries a plurality of electrically conducting contacting members each contacting a respective one of the plurality of rings of the first wafer and one of the plurality of radially extending electrical conductors on the third wafer. As the second wafer is rotated, each of the contacting members of the second wafer remains in electrical contact with its respective ring, but is switched to a different radially extending member.

10 Claims, 4 Drawing Figures

ROTARY WAFER SWITCH HAVING ROTOR MOUNTED, SPIRAL ARRANGED AXIAL BRIDGING CONTACTS

BACKGROUND OF THE INVENTION

1. Field of the Invention

This invention relates to electrical switches, and, more particularly, to switches for conducting a plurality of inputs to a plurality of selectible outputs.

2. Description of the prior art

It is often desirable to switch in steps a plurality of electrical signals among a series of corresponding output channels in which each output channel corresponds to one input signal at each step. One example is in seismic exploration. Frequently a number of geophone arrays are arranged in a desired pattern. The output from each geophone array is assigned to a corresponding electrical channel for recording or other data handling process. In conducting the survey the geophone outputs may be switches to different processing channels. For example, if twelve geophone arrays are used, at one seismic generating configuration the arrays may be assigned to channels 1–12. In another configuration they may be assigned to channels 2–12, and 1, then 3–12, and 1–2, then 4–12, and 1–3, and so forth.

In the past, such switching has been achieved in the field with relatively complex patchboard arrangements in which each geophone output is brought to a corresponding plug, and each data processing channel to a different plug. A patch cord or the like is then connected between the appropriate geophone plug and the data processing channel plug. This arrangement, however, is particularly cumbersome since each time the data channels must be switched, each patch plug must be removed and reinserted into the new arrangement.

BRIEF DESCRIPTION OF THE INVENTION

In light of the above, it is, therefore, an object of the invention to provide a switch for switching each of a plurality of inputs to a respective one of a plurality of outputs.

The invention, in its broad aspect, presents a switch having first, second and third electrically insulating wafers. The wafers are mounted on a common axis, the first and third wafers held in fixed parallel relationship, and the second wafer disposed intermediate and parallel to the first and third wafers, rotatable on the axis with respect to the first and third wafers. A plurality of electrical conductor rings affixed to the first wafer on a side toward the second wafer are arranged concentrically with the axis, and a corresponding plurality of electrical conductors affixed to the third wafer on a face toward the second wafer extend radially outward from the axis. A plurality of electrical contactor means extend between the faces of the second wafer, each contacting one of the plurality of electrical conductor rings on the first wafer and one of the plurality of radially extending electrical conductors of the third wafer to establish an electrical conduction path therebetween. When the second wafer is rotated with respect to the first and third wafers, each of the electrical contactor means of the second wafer remain in electrical contact with its associated ring of the first wafer, but is brought into contact with a different radially extending contact of the third wafer, to establish an electrical conduction path between the associated ring and the different radially extending contact.

BRIEF DESCRIPTION OF THE DRAWING

The invention is illustrated in the accompanying drawing in which.

In the various figures of the drawing, like reference numerals are used to denote like parts. The size and dimension of various ones of the parts shown in the drawing have been exaggerated or distorted for clarity of illustration and ease of description.

DETAILED DESCRIPTION OF THE PREFERRED EMBODIMENTS

Figure 1:
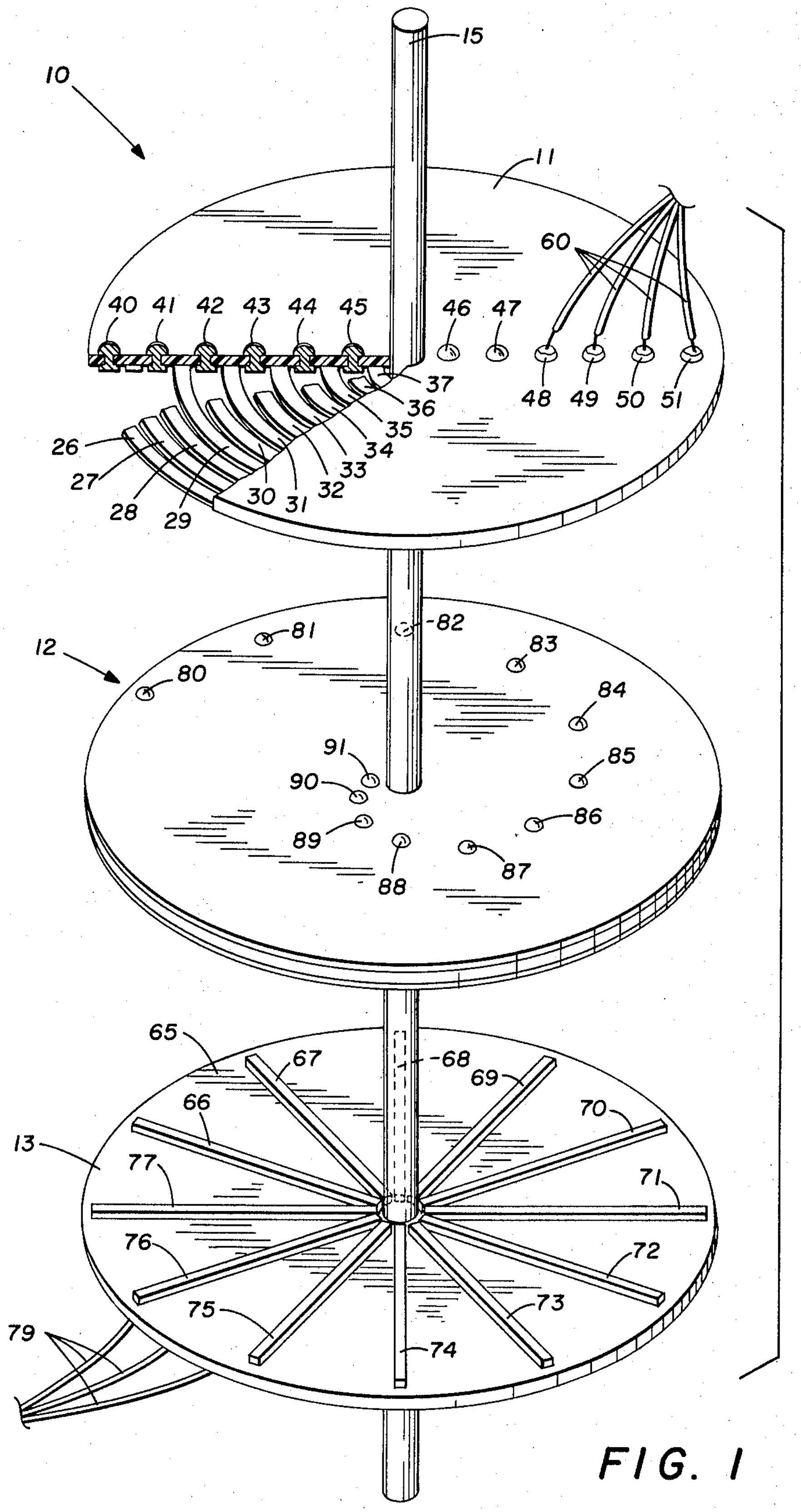
FIG. 1 is an exploded perspective view of the switch in accordance with the invention.

As shown in FIG. 1, the switch 10, in accordance with the invention, includes three discs or wafers 11, 12, and 13 of generally circular shape. The wafers 11, 12, and 13 are of an electrical insulation material, such as plastic, fiberglass, Bakelite, or the like, and are aligned on a common axis to receive a shaft 15, which is free to turn in holes 16 and 17 in the outside wafers 11 and 13, respectively, but which is attached to or is rotationally constrained with respect to the middle wafer 12. The shaft 15 may be, for example, of semicircular cross section as illustrated, to correspond to the shape of the semi-circular hole 19 in the middle wafer 12, to enable the middle wafer 12 to be rotated with respect to the outside wafers 11 and 13.

Mounted or affixed to the inner face 25 of the first wafer 11 in the direction of the middle wafer 12 are a plurality of electrically conducting rings 26–37, generally coaxially or concentrically disposed about its center hole 16. The conductors 26–37 can be of any electrical conducting material, and, conveniently, may be of gold plated copper, or the like, which can easily be printed onto the insulating wafer 11, in accordance with well known etched or printed circuit board techniques.

Extending through the top wafer 11 are a plurality of metallic contactors 40–51, each making electrical contact with a respective one of the rings 26–37. Electrical connections via wires 60 or the like can be made to each of the connectors 40–51 thereby directing, for example, a discrete electrical input signal, for instance, from a geophone array output, to each of the rings 26–37 of the switch 10.

The bottom wafer 13 has on its inner face 65 in the direction of the middle wafer 12 a plurality of electrical conductors 66–77 extending outwardly from the center axis of the wafer. The conductors 66–77, in a manner similar to that of rings 26–37, can be affixed by etch or printed circuit board techniques, and may, for instance, be copper coated with gold, or other appropriate electrical conducting material. Each of the outwardly extending conductors 66–77 will correspond by connection to one of rings 26–37, as below described, therefore are of equal number in the particular embodiment shown. It should be understood, however, that in particular instances in which it is desired to switch a first plurality of signals to a second larger plurality of outputs with some of the outputs unconnected in various operating modes, the number of radially extending members may be different from that of the conductor rings. Other input/output configurations also may be used, depending upon the particular desired application of the switch 10.

In a fashion similar to that of metallic conductors 40–51 for connection to the rings of the top wafer 11, metallic conductors are provided for electrical contact to the outwardly extending conductors 66–77, extending through the bottom wafer 13. (See, for example, FIG. 4.)

The middle wafer 12 includes a plurality of electrical contactor means, such as the feedthrough contactors 80–91 shown. The contactors 80–91 extend through the wafer 12 to present an electrically conducting surface at the same relative position on the top and bottom of the wafer 12. Each of the contactors 80–91 corresponds in its distance from the axis of the middle wafer 12 to the distance of a respective one of the rings 26–37 from the axis of the top wafer 11. Thus, for instance, the distance that the innermost contactor 91 is from the center of the wafer 12 corresponds with the radius of ring 37 of the top wafer 11. The next contactor 90 is of distance corresponding to the radius of the ring 36, second from the center and so forth. Likewise, the angular spacing of each of the contactors 80–91 corresponds with the angular displacement of the radially extending conductors 66–77. Thus, at any operable switch position, each of the contactors 80–91 will contact one of the radially extending conductor members 66–77.

Figures 2, 4:
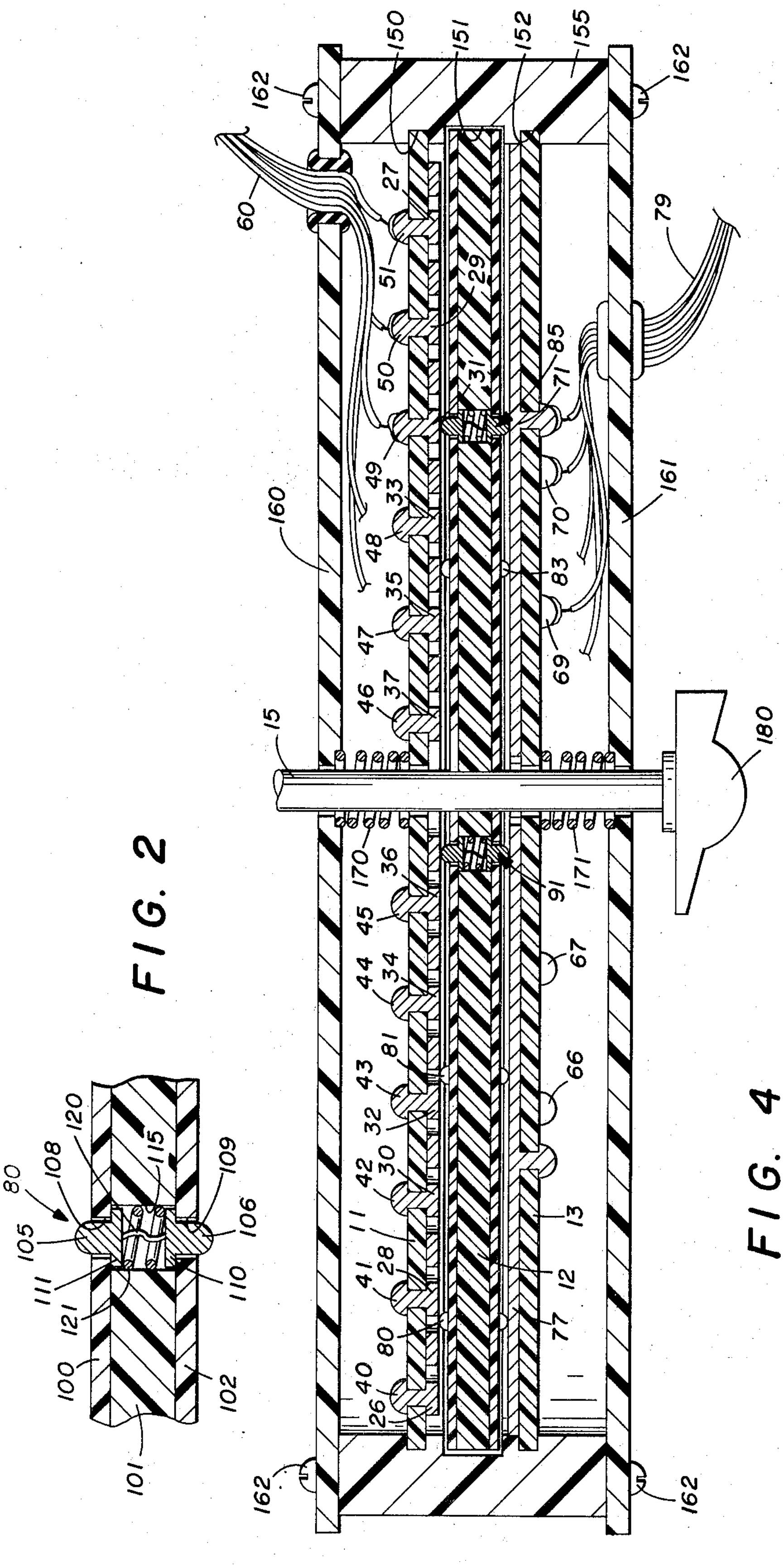
FIG. 2 is a side elevation, in cross section, of a portion of the middle or second wafer of FIGURE 1, illustrating a preferred configuration for the feedthrough conductor, in accordance with the invention.
FIG. 4 is a side elevation, partly cut away, illustrating the arrangement of the elements of the switch of FIG. 1, in accordance with the invention.

One electrical feedthrough contactor embodiment is shown in FIG. 2. To receive and hold the contactor, the middle wafer 12 includes three insulating layers 100, 101, and 102. One of the electrical contactors, for example, electrical contacting member 80, includes top and bottom contactor members 105 and 106, which may have a rounded portion extending through holes 108 and 109 in the outer wafers 100 and 102. The rounded portions of contactors 105 and 106 facilitate movement of the contactor along rings 26–37 or across the contactors 66–77. To constrain the contactor members 105 and 106, shoulders 110 and 111 are provided to interfit a hole 115 within the inner layer 101, the diameter of the hole 115 being slightly larger than holes 108 and 109 to allow movement of the contactor members 105 and 106 in the direction of each other. An electrical connector, such as wire strap 120, soldered or otherwise electrically connected to the contactor members 105 and 106 insures electrical continuity between the electrical contactor members 105 and 106. Additionally, a spring 121 between the contactor members 105 and 106 outwardly biases them, but enables yielding pressure during the switching operation.

Figure 3:
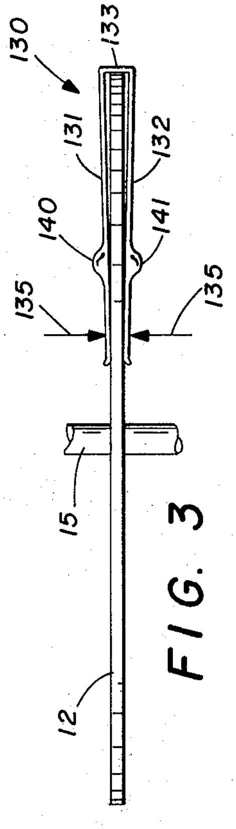
FIG. 3 is a side view of the middle or second wafer of the switch of FIG. 1, illustrating an alternative embodiment of a feedthrough conductor, in accordance with the invention.

An alternative embodiment for contactors 80–91 is shown in FIG. 3. The contactor is in the form of an electrically conducting clip 130, one such clip corresponding to each desired contactor location. The clip 130 includes first and second elongated members 131 and 132 connected with a joining portion 133, to present a bias of each of the members 131 and 132 in the direction of each other as shown by arrows 135. At an appropriate location along the elongated length of portions 131 and 132 are formed protrusions 140 and 141. The protrusions 140 and 141 can be formed, for instance, by punching the elongated members 131 and 132 at the desired location from the inside to form the protrusions illustrated. The protrusions, such as 140 and 141, corresponding to the desired radial distance of the conductor rings 26–37 to which contact is intended will, of course, be appropriately adjusted for each clip along the length of the elongated members 131 and 132. Thus, if connections between the particular conductor rings 26–37 and radially extending members 66–77 is desired in a particular sequence, the sequence can be arranged or altered merely by appropriate arrangement of the conductor clips.

The wafers 11, 12, and 13, in operation, can be arranged as shown in FIG. 4. Each of the wafers 11, 12, and 13 can be disposed in a track or race 150, 151, and 152, respectively, in a common receiving block 155, as shown, or in a plurality of receiving blocks. The receiving block 155 receives, additionally, face plate members 160 and 161, which are affixed to the receiving block 155 by screws 162, or the like. It is understood, of course, that the receiving block 155 is desirably of plastic or other insulating material, but, since no actual electrical connection is made to the conductor elements of the switch, can be of an electrically conducting material, for example, for electromagnetic field shielding purposes. The wafers 11 and 13 are biased in the direction of the center rotating wafer 12 by springs 170 and 171, which are coaxially disposed about the shaft 15 upon which the center wafer 12 is operably rotatably affixed. For ease of turning the shaft 15, a handle or knob 180 may be provided.

In operation, referring to FIGS. 1 and 4, a plurality of inputs are connected to the connectors 40–51, therefore, to respective ones of rings 26–37. Output conductor lines 79 are connected to corresponding connectors (see FIG. 4) to respective ones of radially extending members 66–77. Thus, each of the rings 26–37 is in electrical contact by virtue of the contactors 80–91 on the middle wafer 12 with a respective one of radially extending members 66–77. When the center wafer 12 is rotated by shaft 15 an angular amount corresponding to the angular separation of the radially extending members 66–77, each of the contactor members 80–91 is brought into contact with the next radially extending member in sequence, in the direction of rotation. The top portion of the contactors 80–91, however, remain in contact with the same conductor rings 26–37. Thus, the input lines 60 are sequentially switched among the output lines 77 via the radially extending members 66–77, as the center or middle wafer 12 is rotated.

Although the invention has been described and illustrated with a certain degree of particularity, it is understood that the present disclosure is made by way of illustration only and that numerous changes and modifications will become apparent to those skilled in the art without departing from the spirit and scope of the invention as hereinafter claimed.

I claim:

1. A switch comprising:

first, second, and third wafers of electrically insulating material, means for mounting said first, second, and third wafers on a common axis whereby said first and third wafers are held in a fixed parallel position and said second wafer is disposed intermediate and parallel to said first and third wafers, and is rotatable on said axis with respect to said first and third wafers, a plurality of electrical conductor rings affixed concentrically with said axis to said first wafer on a side toward said second wafer, a plurality of electrical conductors affixed to said third wafer on a face toward said second wafer, radially extending outwardly from said axis, and a plurality of electrical contactor means extending between the faces of said second wafer, each contacting an associated one of said plurality of electrical conductor rings on said first wafer and one of said plurality of radially extending electrical conductors of said second wafer to establish an electrical conduction path therebetween, whereby when said second wafer is rotated with respect to said first and third wafers, each of said plurality of electrical contactor means of said second wafer remains in electrical contact with its associated ring of said first wafer, and is brought into contact with a different radially extending contact of said third wafer to establish an electrical conduction path with said different radially extending contact of said third wafer.

2. The switch of claim 1 wherein said plurality of electrical conductor rings and said plurality of said radially extending electrical conductors are metallic layers printed respectively upon said first and third layers.

3. The switch of claim 1 wherein said plurality of electrical contactor means extending between the faces of said second wafer comprises a plurality of clips, each including first and second elongated portions and a portion joining said first and second elongated portions to bias the free ends of said elongated portions together, whereby said elongated portions are adapted to be disposed on opposite faces of said second wafer to maintain the position of said clip, said elongated and joining portions being of electrical conducting material, each of said first and second elongated portions having a protrusion at corresponding locations along their elongated length adapted to respectively contact one of said rings and one of said radially extending electrical conductors.

4. The switch of claim 3 wherein said clips are gold plated.

5. The switch of claim 1 wherein said rings and radially extending electrical conductors are of gold plated copper etched on said first and third wafers.

6. The switch of claim 1 wherein said plurality of electrical conductor means of said second wafer extend through said wafer from one face to the other; are disposed in an angular relationship corresponding to the angular relationship of said radially extending conductors of said third wafer; and are each disposed a distance from the axis of said second wafer corresponding to the radius of its associated ring on said first wafer.

7. The switch of claim 6 wherein said radially extending conductors are disposed at equal angles on said second wafer about said axis.

8. The switch of claim 1 wherein said first, second, and third wafers are of plastic.

9. The switch of claim 1 wherein said first, second, and third wafers are fiberglass.

10. The switch of claim 1 wherein said first, second, and third wafers are Bakelite.

* * * * *